US008965589B2

(12) United States Patent
Zhao

(10) Patent No.: US 8,965,589 B2
(45) Date of Patent: Feb. 24, 2015

(54) CIRCUIT AND METHOD FOR MAXIMUM POWER POINT TRACKING OF SOLAR PANEL

(75) Inventor: Chen Zhao, Hangzhou (CN)

(73) Assignee: Silergy Semiconductor Technology (Hangzhou) Ltd, Hangzhou (CN)

( * ) Notice: Subject to any disclaimer, the term of this patent is extended or adjusted under 35 U.S.C. 154(b) by 472 days.

(21) Appl. No.: 13/432,705

(22) Filed: Mar. 28, 2012

(65) Prior Publication Data

US 2012/0265354 A1 Oct. 18, 2012

(30) Foreign Application Priority Data

Apr. 14, 2011 (CN) .......................... 2011 1 0096084

(51) Int. Cl.

| | |
|---|---|
| ***G05D 3/12*** | (2006.01) |
| ***G05D 5/00*** | (2006.01) |
| ***G05D 9/00*** | (2006.01) |
| ***G05D 11/00*** | (2006.01) |
| ***G05D 17/00*** | (2006.01) |
| ***G05F 1/67*** | (2006.01) |

(52) U.S. Cl.

CPC ........................................ *G05F 1/67* (2013.01)
USPC ............................ 700/286; 700/288; 700/296

(58) Field of Classification Search

CPC ......................................................... G05F 1/67
USPC .......................................... 700/286, 288, 296
See application file for complete search history.

(56) References Cited

U.S. PATENT DOCUMENTS

| | | | | |
|---|---|---|---|---|
| 4,580,090 A * | 4/1986 | Bailey et al. | 323/303 |
| 8,013,566 B2 * | 9/2011 | Haines | 320/101 |
| 8,338,987 B2 * | 12/2012 | O'Brien et al. | 307/82 |
| 2002/0163323 A1 * | 11/2002 | Kasai et al. | 323/284 |
| 2007/0119718 A1 * | 5/2007 | Gibson et al. | 205/637 |
| 2010/0157632 A1 * | 6/2010 | Batten et al. | 363/74 |
| 2010/0176773 A1 * | 7/2010 | Capel | 323/266 |
| 2011/0224839 A1 * | 9/2011 | Thompson | 700/297 |
| 2011/0316346 A1 * | 12/2011 | Porter et al. | 307/82 |

OTHER PUBLICATIONS

Low cost MPPT controller for off grid solar applications by He et al. dated Oct. 10-13, 2010.*
Real-Time Identification of Optimal Operating points in Photovoltaic Power Systems by Xiao et al. dated Aug. 2006.*

* cited by examiner

*Primary Examiner* — Mohammad Ali
*Assistant Examiner* — Ziaul Karim
(74) *Attorney, Agent, or Firm* — Michael C. Stephens, Jr.

(57) ABSTRACT

The present invention relates to a maximum power point tracking circuit for a solar panel. In one embodiment, the circuit can include: a real-time power calculator that receives a real-time output voltage and a real-time output current of the solar panel, and generates a real-time power of the solar panel; a memory power generator coupled to the real-time power calculator, and that generates a memory power based on the real-time power; a comparing circuit that compares the real-time power against the memory power, where an output of the comparing circuit is configured to control a controlling signal for a solar power supply apparatus; and a reset circuit that receives the real-time output voltage of the solar panel, where an output of the reset circuit is configured to control the controlling signal.

20 Claims, 11 Drawing Sheets

CIRCUIT AND METHOD FOR MAXIMUM POWER POINT TRACKING OF SOLAR PANEL

RELATED APPLICATIONS

This application claims the benefit of Chinese Patent Application No. CN201110096084.X, filed on Apr. 14, 2011, which is incorporated herein by reference in its entirety.

FIELD OF THE INVENTION

The present invention generally pertains to a solar power supply system, and more particularly to a circuit and method for maximum power point tracking of a solar panel.

BACKGROUND

Solar power is an increasingly important power source in view of non-pollution, non-noise, and simplified maintenance aspects. However, solar panel output may be easily influenced by illumination intensity, environmental temperature, and load. In addition, solar panels may have non-linear characteristics, and the output voltage of the solar panel may differ even when illumination intensity and environmental temperature are relatively constant. As a result, a controlling circuit may be used to improve efficiency by tracking the maximum power point in order to control the output voltage of the solar panel. However, conventional solar panel power tracking circuits may be relatively complicated and expensive, and may not be applicable for large-scale solar panel arrays.

SUMMARY

In one embodiment, a maximum power point tracking circuit for a solar panel, can include: (i) a real-time power calculator that receives a real-time output voltage and a real-time output current of the solar panel, and generates therefrom a real-time power of the solar panel; (ii) a memory power generator coupled to the real-time power calculator, where the memory power generator generates a memory power based on the real-time power; (iii) a comparing circuit that compares the real-time power against the memory power, where an output of the comparing circuit is configured to control a controlling signal for a solar power supply apparatus; and (iv) a reset circuit that receives the real-time output voltage of the solar panel, where an output of the reset circuit is configured to control the controlling signal, (v) where a trend of the controlling signal is maintained such that the solar power supply apparatus is in a normal operation when the real-time power is increasing, and (vi) where the trend of the controlling signal is changed, and the controlling signal is recovered after a certain interval, when the real-time power is decreasing.

In one embodiment, a maximum power point tracking method for a solar panel, can include: (i) generating a real-time power and a memory power from a real-time output voltage and a real-time output current of the solar panel; (ii) comparing the real-time power against the memory power; (iii) controlling a controlling signal in response to the comparison of the real-time power and the memory power; (iv) detecting the real-time output voltage and an average output voltage of solar panel; and (v) recovering the controlling signal when the real-time output voltage is higher than the average output voltage by at least a predetermined threshold.

Embodiments of the present invention can advantageously provide several advantages over conventional approaches. For example, particular embodiments can provide a maximum power point tracking (MPPT) circuit and method that determines a trend of a controlling signal in accordance with real-time power. In this way, the output voltage of the solar power supply apparatus may be at a value substantially corresponding to the maximum power point for improved solar power supply efficiency. Other advantages of the present invention will become readily apparent from the detailed description of preferred embodiments below.

DETAILED DESCRIPTION

Figure 1A:
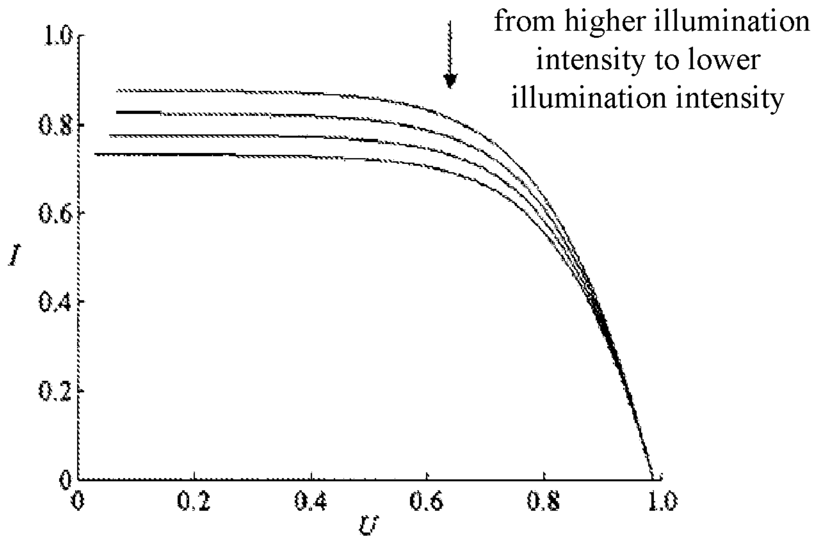
FIGS. 1A and 1B are curve diagrams indicating example output voltages and currents of a solar panel.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms “wire,” “wiring,” “line,” “signal,” “conductor,” and “bus” refer to any known structure, construction, arrangement, technique, method and/or process for physically transferring a signal from one point in a circuit to another. Also, unless indicated otherwise from the context of its use herein, the terms “known,” “fixed,” “given,” “certain” and “predetermined” generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. Particular embodiments may provide a maximum power point tracking (MPPT) circuit and method that determines a trend of a controlling signal in accordance with real-time power. In this way, the output voltage of the solar power supply apparatus may be at a value substantially corresponding to the maximum power point for improved solar power supply efficiency. The invention, in its various aspects, will be explained in greater detail below with regard to exemplary embodiments.

Figure 1B:
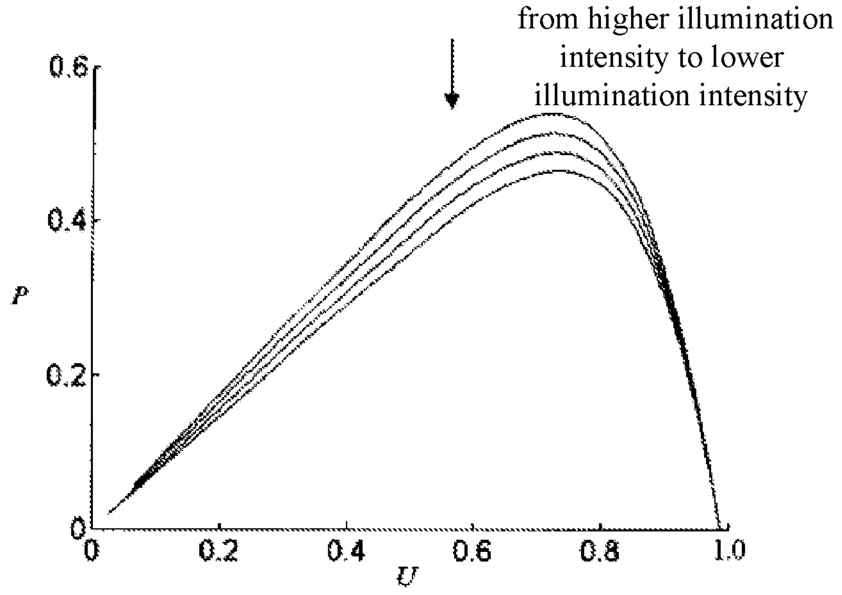

The output power of a solar panel will be at a maximum value when the output voltage is at a certain value. As shown in the examples of FIGS. 1A and 1B, on this condition the working point of the solar panel may be at a highest point of the curve diagram indicating output power and output voltage, or the maximum power point (MPP). Thus, a controlling circuit may be used to improve efficiency by tracking the maximum power point to control the output voltage of the solar panel.

Figure 1C:
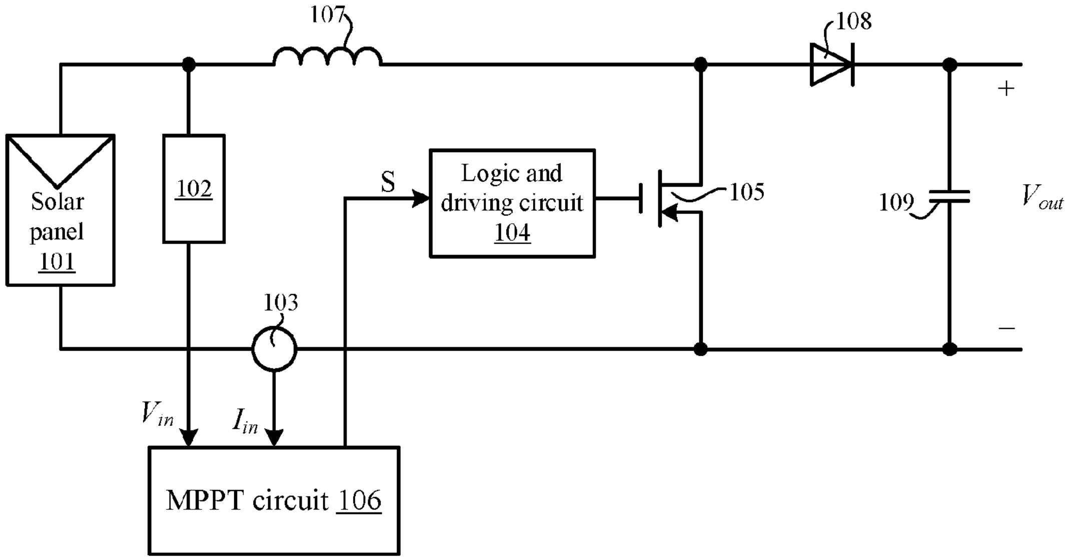
FIG. 1C is a schematic diagram of an example solar power system.

With reference to FIG. 1C, an example solar power supply apparatus is shown. The example solar power supply apparatus can include solar panel 101, output voltage detector 102, output current detector 103, logic and driving circuit 104, MPPT circuit 106, and a boost power stage including transistor 105, inductor 107, output diode 108, and output capacitor 109. Logic and driving circuit 104 may be used to generate a driving signal to control operation of transistor 105 to output a voltage across output capacitor 109 in accordance with the controlling signal of MPPT circuit 106. In this way, the output voltage may be maintained as a value corresponding to a maximum power point and the solar panel in a maximum power state.

For example, various digital integrated circuits (ICs), such as a digital signal processor (DSP), microcontroller unit (MCU) may be used to implement such an MPPT circuit. However, such implementations may lead to a relatively complicated controlling scheme, increased size, and higher costs, particularly for portable apparatuses. In addition, due to numerous data sampling systems and redundancy limitations, some such approaches may not be suitable for large scale solar panel array, resulting in difficulty in updating and managing of solar power supply systems.

Various analog controlling approaches may also be utilized. However, open loop voltage detection may prove difficult to obtain sufficient precision for maximum power point tracking of a solar panel. In addition, this type of analog controlling approach may be influenced by illumination intensity and temperature.

In one embodiment, a maximum power point tracking circuit for a solar panel, can include: (i) a real-time power calculator that receives a real-time output voltage and a real-time output current of the solar panel, and generates therefrom a real-time power of the solar panel; (ii) a memory power generator coupled to the real-time power calculator, where the memory power generator generates a memory power based on the real-time power; (iii) a comparing circuit that compares the real-time power against the memory power, where an output of the comparing circuit is configured to control a controlling signal for a solar power supply apparatus; and (iv) a reset circuit that receives the real-time output voltage of the solar panel, where an output of the reset circuit is configured to control the controlling signal, (v) where a trend of the controlling signal is maintained such that the solar power supply apparatus is in a normal operation when the real-time power is increasing; and (vi) where the trend of the controlling signal is changed, and the controlling signal is recovered after a certain interval, when the real-time power is decreasing.

Figure 2:
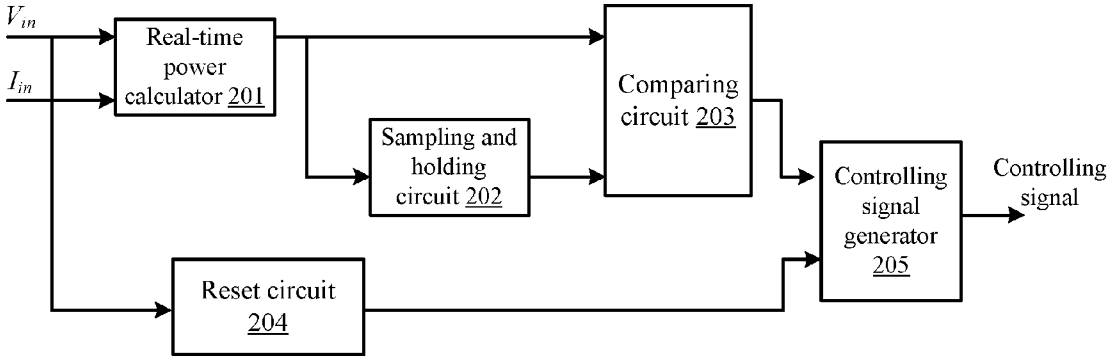
FIG. 2 is a block diagram of a first example maximum power point tracking apparatus for a solar panel, in accordance with embodiments of the present invention.

Referring now to FIG. 2, shown is a schematic diagram of a first example maximum power point tracking (MPPT) apparatus for a solar panel, in accordance with the embodiments of the present invention. In this example, the MPPT circuit can include real-time power calculator 201, memory power generator (e.g., sampling and holding circuit) 202, comparator or comparing circuit 203, and reset circuit 204.

In operation, real-time power calculator 201 can receive real-time output voltage $V_{in}$ and real-time output current $I_{in}$, and may use these to generate real-time power $P_{PV}$ of the solar panel. Memory power generator 202 can be to real-time power calculator 201 to receive the real-time power $P_{PV}$, and generate therefrom a memory power $P_{PV}'$. A first input terminal of comparator 203 may be coupled to the real-time calculator 201 to receive real-time power $P_{PV}$, while a second input terminal may be coupled to the memory power generator 202 to receive the memory power $P_{PV}'$, to compare real-time power $P_{PV}$ against memory power $P_{PV}'$.

Reset circuit 204 may be coupled to solar panel 101 to receive the output voltage $V_{in}$. Controlling signal generator 205 may be coupled to an output terminal of comparator 203 and an output terminal of reset circuit 204 to generate a controlling signal. When real-time power $P_{PV}$ is detected as increasing (e.g., continuously increasing), the solar power apparatus can maintain a normal operation. However, when real-time power $P_{PV}$ is detected as decreasing (e.g., continuously decreasing), a trend of the controlling signal may be changed, and the controlling signal can be recovered after a predetermined interval.

For example, the frequency of memory power generator 202 and comparator 203 may be higher than a frequency of solar power apparatus (e.g., greater than 10 times). This frequency difference may facilitate real-time detection of real-time power and memory power to substantially guarantee precision of the maximum power point tracking apparatus.

The example maximum power point tracking apparatus of a solar panel, as shown in FIG. 2, may determine a trend of present output power by detecting the present power in real-time. In this way, the controlling signal may be changed or controlled (e.g., maintained, increased, decreased, maintain the trend, change the trend, etc.) to regulate an output voltage of the solar power apparatus substantially at a value of the maximum power point. Accordingly, advantages of faster tracking and lower disturbance due to tracking and regulation in each switching cycle can be used to effectively place the solar panel in a long-term maximum output power status, to increase reliability and expansibility, and to lower costs by facilitating integration by using exemplary circuit design techniques.

Figure 3:
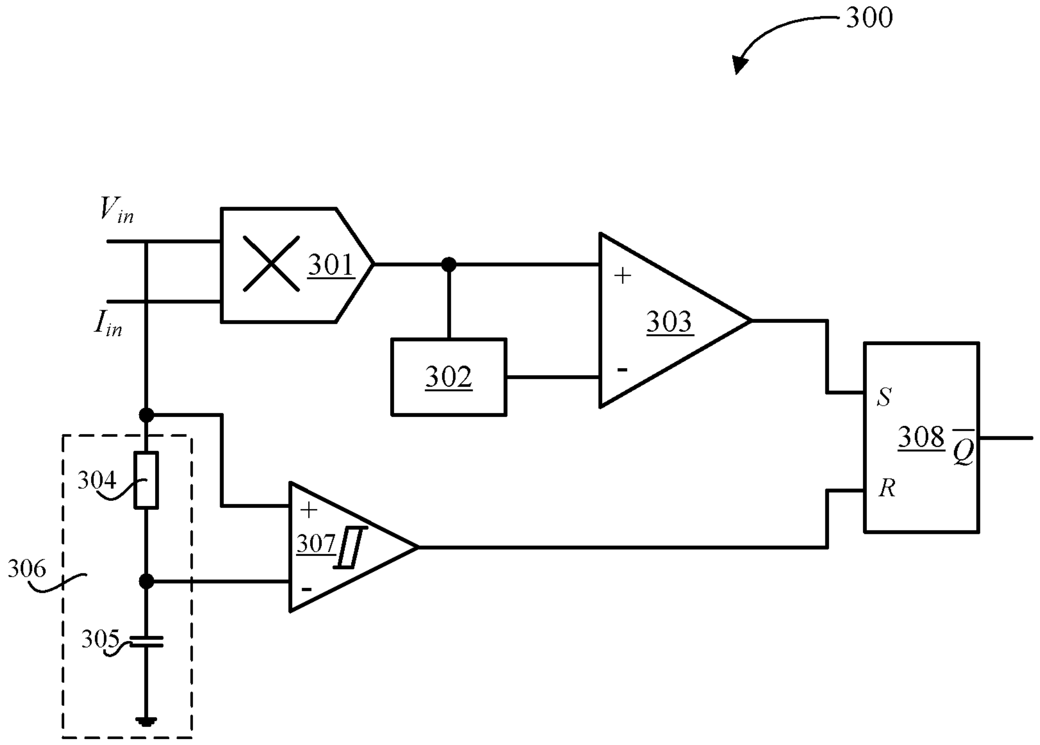
FIG. 3 is a schematic diagram of a second example maximum power point tracking apparatus for a solar panel, in accordance with embodiments of the present invention.

With reference to FIG. 3, a schematic diagram of a second example maximum power point tracking apparatus 300 in accordance with embodiments of the present invention is shown. In this example, multiplier 301 may be used as a real-time power calculator that receives real-time output voltage $V_{in}$ and real-time output current $I_{in}$ of solar panel 101, and generates therefrom the present real-time power $P_{PV}$ of the solar panel.

Sampling and holding circuit 302 may be used as a memory power generator coupled to multiplier 301. Sampling and holding circuit 302 may receive the real-time power $P_{PV}$, and may generate therefrom a memory power $P_{PV}'$ in the range of a holding voltage. Sampling and holding circuit 302 may be implemented using any suitable types of sampling and holding functionality circuits. Comparator 303 may be used as a comparing circuit, and the non-inverting input terminal of which may be coupled to multiplier 301 to receive real-time power $P_{PV}$, while the inverting input terminal of which may be coupled to sampling and holding circuit 302 to receive memory power $P_{PV}'$.

Reset circuit 204 can include average output voltage detector 306 that can convert an output voltage of the solar panel to an average output voltage $V_{in}'$. Comparator 307 can include a hysteresis threshold $V_{th}$. The average output voltage detector 306 can be coupled to a non-inverting input terminal of hysteresis comparator 307 that also receives real-time output voltage $V_{in}$, while the inverting input terminal may be coupled to the average output voltage detector to receive average output voltage $V_{in}'$. In addition, average output voltage detector 306 can include resistor 304 and capacitor 305 connected in series as shown between output voltage $V_{in}$ of the solar panel and ground.

RS flip-flop 308 can be used as a controlling signal generator (e.g., 205 of FIG. 2). The set terminal of RS flip-flop 308 may be coupled to an output of comparator 303, and the reset terminal of RS flip-flop 308 can be coupled to an output of hysteresis comparator 307. In operation, when real-time power $P_{PV}$ is higher than memory power $P_{PV}'$, the output of comparator 303 may set RS flip-flop 308, and the output of RS flip-flop 308 may remain high to maintain the controlling signal such that the solar power apparatus is in a normal operation.

When real-time power $P_{PV}$ is less than memory power $P_{PV}'$, an output of RS flip-flop can flip or change state (e.g., from high to low, or low to high) to turn over the controlling signal. The real-time output voltage $V_{in}$ and average output voltage $V_{in}'$ may be compared by hysteresis comparator 307. When the real-time output voltage $V_{in}$ is higher than an average output voltage $V_{in}'$ by at least the hysteresis threshold $V_{th}$, RS flip-flop 308 may be reset to recover the controlling signal. In ongoing repeatable fashion, the output voltage of the solar power apparatus may maintain at the voltage value at which the output power is at a substantially maximum power point.

For example, the hysteresis threshold of hysteresis comparator 307 can be determined according to circuit parameters to maintain or make the maximum power point tracking apparatus in an optimum status. The maximum power point tracking apparatus of the solar panel may also determine the trend of output power in accordance with real-time power and memory power. When real-time power is decreasing, the output of the solar power supply apparatus may be turned off. When to recover the output can be determined according to real-time output voltage and average output voltage. When real-time output voltage is higher than average voltage by at least a hysteresis threshold, the output can be recovered.

In particular embodiments, the circuit and method for maximum power point tracking of the solar panel of FIG. 3 can take the advantage of faster tracking and lower disturbance due to tracking and regulation in each switching cycle. In this way, the solar panel can be in a long-term maximum output power status, with improved reliability, expansibility, and lower costs due to the analog circuit design for hardware, thus facilitating integration.

Figure 4A:
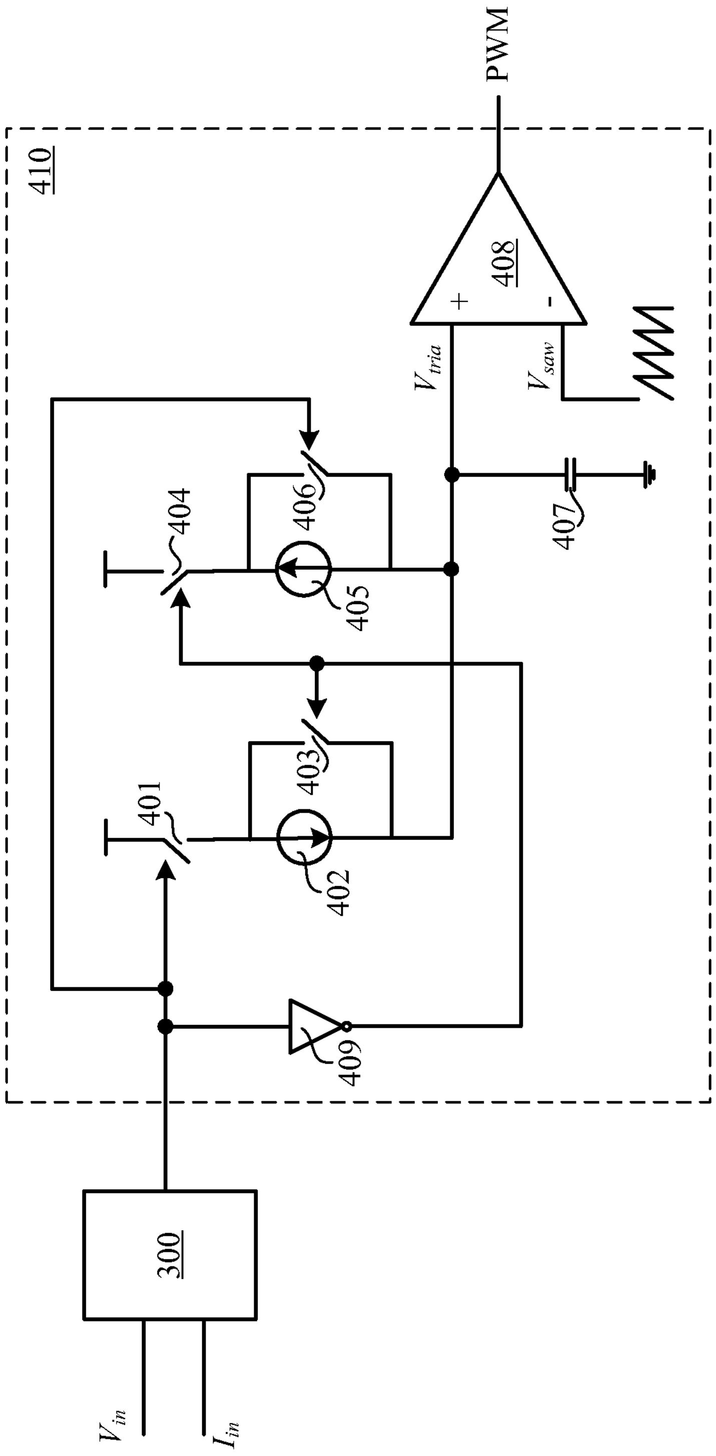
FIG. 4A is a schematic diagram of a third example maximum power point tracking apparatus for a solar panel, in accordance with embodiments of the present invention.

With reference to FIG. 4A, shown is a schematic diagram of a third example maximum power point tracking apparatus for a solar panel, in accordance with embodiments of the present invention. High frequency circuit 410 can be included with maximum power point tracking apparatus 300 of FIG. 3. High-frequency circuit 410 can include first current source 402, second current source 405, first switching circuit including switch 401 and switch 403, second switching circuit including switch 404 and switch 406, comparator 408, inverter 409, and capacitor 407.

A first terminal of capacitor 407 may be coupled to a first terminal of first current source 402, a first terminal of second current source 405, and a non-inverting terminal of comparator 408, and the second terminal of capacitor 407 may be coupled to ground. The non-inverting terminal of comparator 408 can receive reference saw-tooth wave voltage $V_{saw}$. The second terminal of first current source 402 may be coupled to an output terminal of flip-flop 308 (output of circuit 300) through switch 401. The second terminal of second current source 405 may be coupled to the output terminal of RS flip-flop 308 (output of circuit 300) through switch 404 and inverter 409. Switch 406 can connect in parallel with second current source 405 to receive the output of RS flip-flop 308. Also, switch 403 can connect in parallel with first current source 402 to receive an output of inverter 409.

Figure 4B:
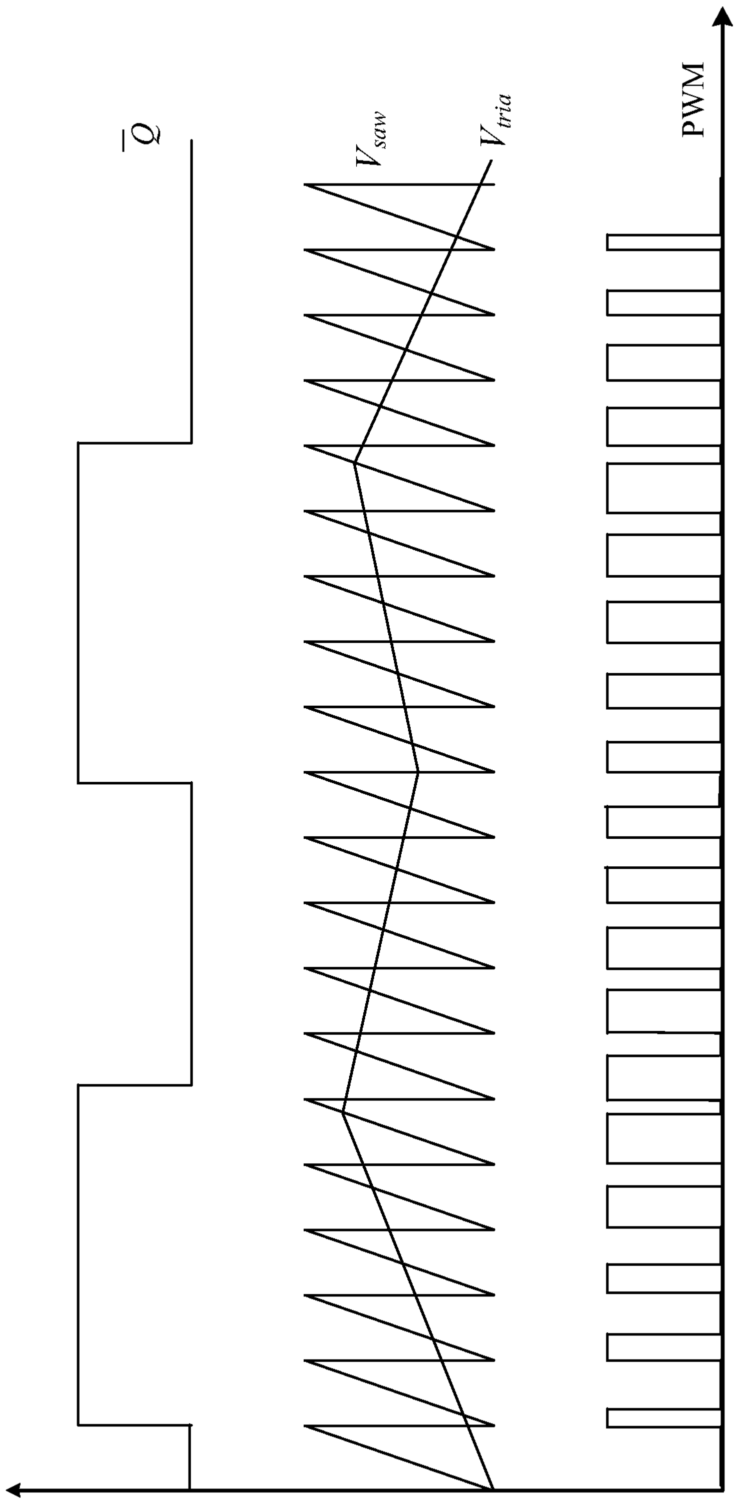
FIG. 4B is a waveform diagram showing an example operation of the maximum power point tracking apparatus shown in FIG. 4A.

The operation of switch 401 and switch 406 can be controlled by output of RS flip-flop 308, and the operation of switches 403 and 404 may be controlled by the output of inverter 409. Example operation waveforms of the maximum power point tracking apparatus of solar panel of FIG. 4A are shown in FIG. 4B. When real-time power $P_{PV}$ is increasing, an output of RS flip-flop 308 is high, and capacitor 407 may be charged continuously by first current source 402. Thus, the voltage of capacitor 407 may be increasing, and may increase a duty cycle of the controlling signal generated by comparator 408. In this case, the controlling signal may be a pulse-width modulation (PWM) type of signal. When detected real-time power $P_{PV}$ is decreasing, an output of RS flip-flop 308 may go low, and capacitor 407 can begin to discharge, thus decreasing a voltage across capacitor 407. In this way, a triangle wave capacitor voltage $V_{tria}$ may be generated.

The reference saw-tooth wave voltage $V_{saw}$ and the triangle wave capacitor voltage $V_{tria}$ may be compared by comparator 408 to generate the controlling signal with a variable duty cycle (e.g., PWM). For the example operation waveform of FIG. 4B representing the example maximum power point tracking apparatus of solar panel of FIG. 4A, when real-time power is increasing, a duty cycle of controlling signal PWM may also keep increasing. When real-time power is decreasing, the duty cycle of controlling signal PWM may be decreasing.

Thus, a controlling signal with a higher frequency and variable duty cycle may be supplied to make the solar power supply apparatus operate substantially in maximum power point working condition. Further, both the charging frequency and the discharging frequency of capacitor 407 may be lower than the operation frequency of the solar power supply apparatus. The example solar power supply apparatus of FIG. 4A can be operated at a higher frequency to facilitate the integration by optimizing the frequency of reference saw-tooth wave voltage $V_{saw}$.

Various maximum power point tracking of solar panel methods will now be described with reference to additional examples. In one embodiment, a maximum power point tracking method for a solar panel, can include: (i) generating a real-time power and a memory power from a real-time output voltage and a real-time output current of the solar panel; (ii) comparing the real-time power against the memory power; (iii) controlling a controlling signal in response to the comparison of the real-time power and the memory power; (iv) detecting the real-time output voltage and an average output voltage of solar panel; and (v) recovering the controlling signal when the real-time output voltage is higher than the average output voltage by at least a predetermined threshold.

Figure 5:
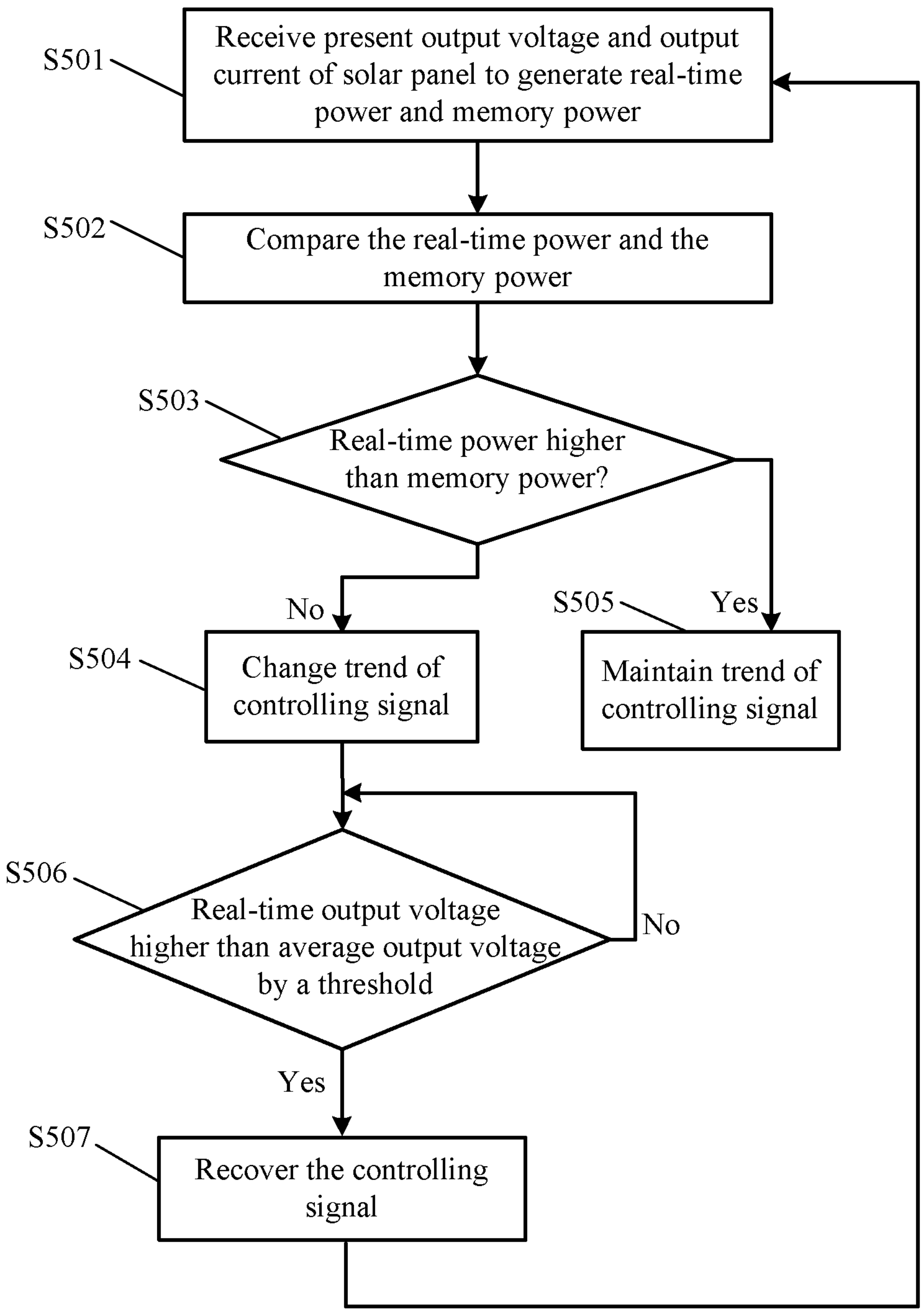
FIG. 5 is a flow diagram of a first example maximum power point tracking method for a solar panel, in accordance with embodiments of the present invention.

Referring now to FIG. 5, shown is a flow diagram of a first maximum power point tracking method of a solar panel in accordance with embodiments of the present invention. At S501, the present or real-time output voltage and current of the solar panel may be used to generate a real-time power and a memory power. At S502, the real-time power and the memory power may be compared. At S503, it may be determined if the real-time power is higher than the memory power.

At S504, the trend of the controlling signal can be changed when the real-time power is lower than the memory power, thus indicating decreasing real-time power. At S504, the trend of the controlling signal can be maintained when the real-time power is higher than the memory power, thus indicating increasing real-time power. At S506, it can be determined if real-time output voltage is higher than average output voltage by a threshold. At S507 the controlling signal may be recovered until the real-time output voltage is higher than the average output voltage by at least the threshold.

The changing trend of the controlling signal (e.g., S504) can be implemented by flipping or changing the state of the controlling signal. For example, when the real-time power is lower than memory power, which indicates decreasing real-time power, the controlling signal is changed from one state to opposite state.

For the maximum power point tracking method for a solar panel as shown in the example of FIG. 5, the changing trend of output power can be determined by detecting real-time power and memory power. The trend of controlling signal can be alternated when real-time power decreases until the real-time output voltage is higher than an average output voltage by a predetermined threshold. This can be achieved by performing a comparison between the real-time output voltage and the average output voltage. By the implementation of the maximum power point tracking method as described above, faster tracking and lower disturbance can be achieved to place and/or maintain the solar power supply apparatus in a maximum power working condition.

Figure 6:
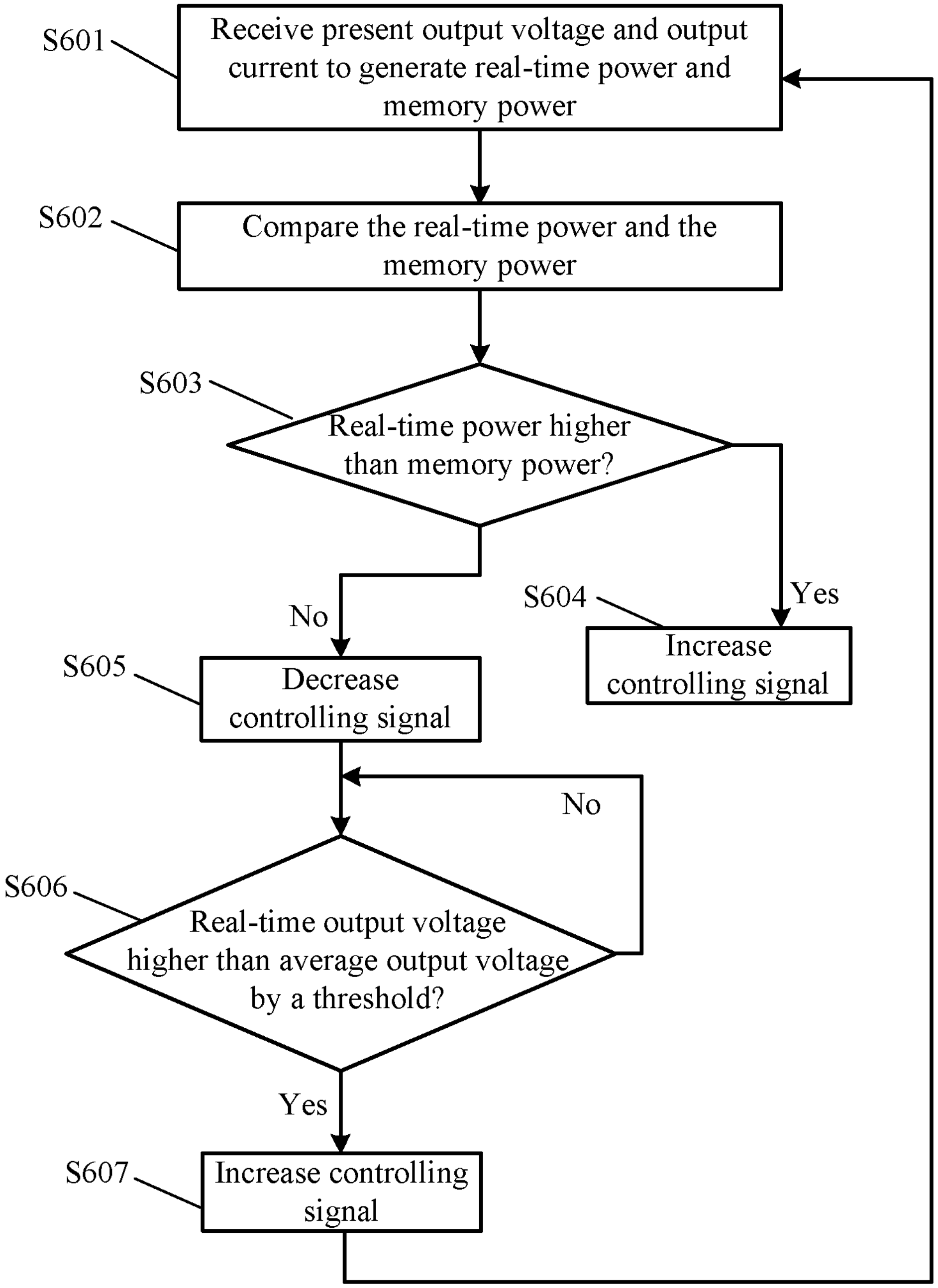
FIG. 6 is a flow diagram of a second example maximum power point tracking method for a solar panel, in accordance with embodiments of the present invention.

With reference to FIG. 6, another flow chart of a second example maximum power point tracking method in accordance with embodiments of the present invention is shown. At S601, the present output voltage and output current of a solar panel can be received and used to generate real-time power and memory power. At S602, the real-time power and memory power can be compared. At S603, it can be determined if real-time power is higher than memory power.

At S604, the controlling signal can be increased when the real-time power is higher than the memory power, thus representing the rising status of real-time power. At S605, the controlling signal may be decreased when real-time power is lower than memory power, thus representing the decreasing status of real-time power. At S606, can be determined if the real-time output voltage is higher than the average output voltage by at least a threshold. At S607, the controlling signal can be increased again until the real-time output voltage is higher than the average output voltage by at least the threshold.

For example, a triangle wave capacitor voltage (e.g., $V_{tria}$) can be achieved by the charging and discharging operation of a capacitor, indicating the rising and decreasing status of real-time power. This triangle wave capacitor voltage $V_{tria}$ may be compared against a reference saw-tooth wave voltage (e.g., $V_{saw}$) with a relatively high frequency to regulate the duty cycle of the controlling signal. In the maximum power point tracking method for a solar panel of FIG. 6 based on the example of FIG. 5, the regulation for the controlling signal can be more flexible and convenient, and a higher frequency can also be achieved, leading to the availability of elements of smaller parameters to facilitate the integration and/or implementation.

Figure 7:
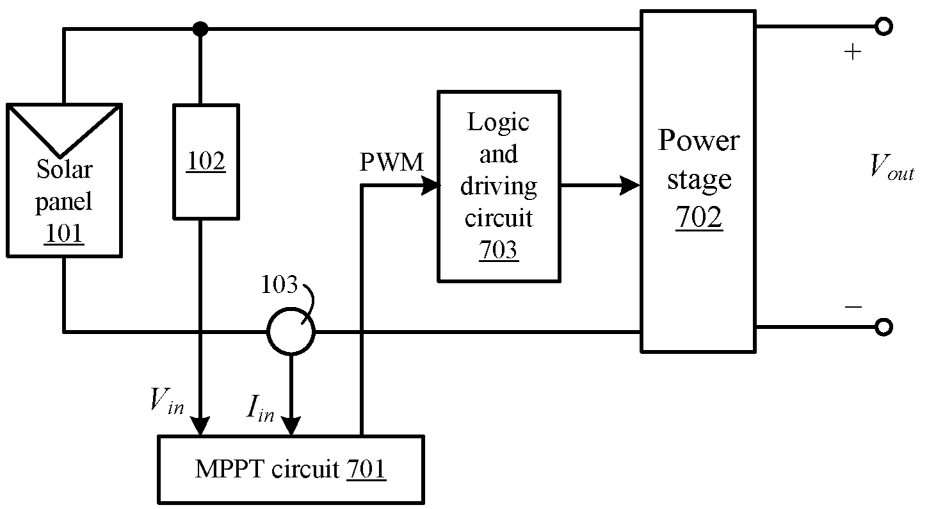
FIG. 7 is a schematic diagram of an example solar power apparatus in accordance with embodiments of the present invention.

Various solar power supply apparatuses and systems will be described below with reference to example structures. As shown in FIG. 7, a schematic diagram of a solar power supply apparatus in accordance with embodiments of the present invention is shown. In this example, MPPT circuit 701, power stage 702, and logic and driving circuit 703 can be included. Here, logic and driving circuit 703 may be coupled to power stage 702 and MPPT circuit 701 to generate a driving signal. The driving signal may be in accordance with, or otherwise based upon, the controlling signal (e.g., PWM) generated by maximum power point tracking apparatus 701. Power stage 702 may be operated in a corresponding switching operation based on the driving signal to output a certain or designated voltage, and as a result the solar power supply apparatus can be operated in a maximum power working condition.

For example, maximum power point tracking apparatus 701 can be implemented as in any of the examples of FIG. 2, FIG. 3, and FIG. 4A. In addition, power stage 702 can be implemented using any available topologies (e.g., buck, boost, buck-boost, flyback, etc.). Further, the power point tracking apparatus and switch of power stage can be integrated into a single IC chip (as an MPPT power chip) to realize advantages of lower cost, higher efficiency, and flexible system modularization. In addition, this integration may be coupled to a storing and filtering circuit of the power stage and the solar panel to form a solar power supply apparatus adapting a modularization design.

Figure 8:
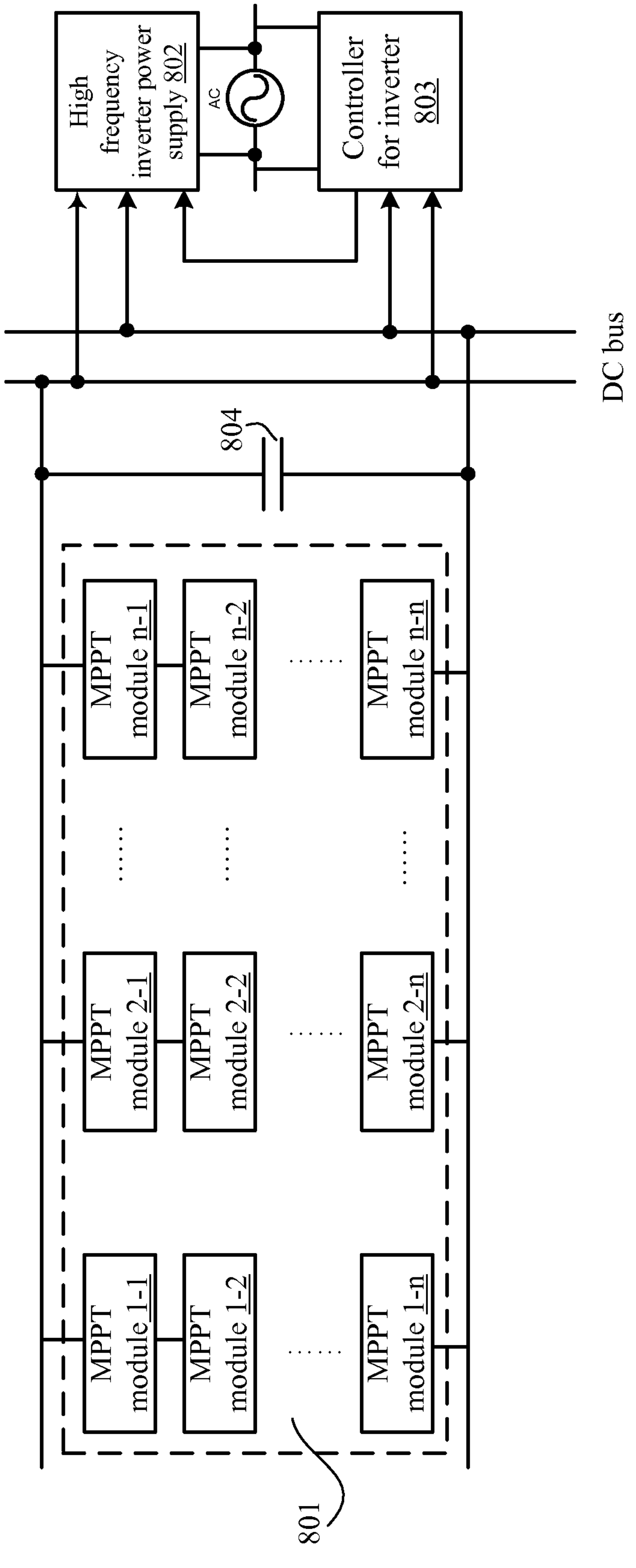
FIG. 8 is a schematic diagram of a solar power system in accordance with embodiments of the present invention.

With reference to FIG. 8, an example solar panel array power supply system is shown in accordance with embodiments of the present invention. This example solar panel array power supply system can include power supply array 801 including $n^2$ solar power supply apparatuses (e.g., MPPT modules, circuits, etc.), capacitor 804, high frequency inverter power supply 802, and controller for inverter 803.

Power supply array 801 can include n branches coupled to outputs of one or more (e.g., a corresponding number of) solar panels, each of which can include n solar power supply apparatuses coupled in series. Output voltages of solar power supply apparatuses may be converted to a DC bus voltage by filtering. High frequency inverter power supply 802 and controller for inverter 803 can receive the DC bus voltage separately, that is converted to an AC voltage by controlling high frequency inverter power supply 802 through controller for inverter 803. For example, this AC voltage output may then be transferred to commercial power grid. Such a large scale integration design may be advantageous for applications of portable products and large scale solar panel array power supply systems adapting the above-mentioned modularization design and maximum power operation.

The foregoing descriptions of specific embodiments of the present invention have been presented through examples for purposes of illustration and description of the maximum power point tracking apparatus and method for a solar panel. They are not intended to be exhaustive or to limit the invention to the precise forms disclosed, and obviously many modifications and variations are possible in light of the above teaching, such as alternatives of the type of switch, comparator, and averaging circuit for different applications. Also, change of trend of the controlling signal can be achieved in different ways, which is not limited to the implementations of flipping or increasing or decreasing of the controlling signal as described in the specification.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A maximum power point tracking circuit for a solar panel, the tracking circuit comprising:

a) a real-time power calculator configured to receive a real-time output voltage and a real-time output current of said solar panel, and to generate therefrom a real-time power of said solar panel;

b) a memory power generator configured to generate a memory power based on said real-time power;

c) a comparing circuit configured to compare said real-time power against said memory power;

d) a reset circuit configured to receive said real-time output voltage of said solar panel;

e) a control signal generator configured to generate a controlling signal based on output signals of said comparing circuit and said reset circuit, wherein a trend of said controlling signal is maintained when said real-time power is increasing, and wherein said trend of said controlling signal is changed when said real-time power is decreasing; and (f) said controlling signal being configured to recover to a previous value that occurred when said real-time power was increasing in response to said real-time output voltage being higher than an average output voltage by at least a predetermined value and said real-time power decreasing.

2. The tracking circuit of claim 1, wherein:

a) when said real-time power is increasing, a duty cycle of said controlling signal increases; and b) when said real-time power is decreasing, said duty cycle of said controlling signal decreases.

3. The tracking circuit of claim 1, wherein:

a) when said real-time power is increasing, said controlling signal is maintained; and b) when said real-time power is decreasing, said controlling signal is inverted.

4. The tracking circuit of claim 1, wherein said real-time power calculator comprises a multiplier configured to receive said real-time output voltage and said real-time output current, and to generate said real-time power.

5. The tracking circuit of claim 1, wherein said reset circuit comprises:

a) an average output voltage detector configured to average said real-time output voltage to generate an average output voltage; and b) a hysteresis comparator having a hysteresis threshold, wherein said hysteresis comparator is configured to compare said real-time output voltage against said average output voltage, wherein said solar power supply apparatus is reset when said real-time output voltage is higher than said average output voltage by at least said hysteresis threshold.

6. The tracking circuit of claim 1, wherein said memory power generator and said comparing circuit have an operating frequency that is higher than an operating frequency of said solar power supply apparatus.

7. The tracking circuit of claim 1, wherein said memory power generator comprises a sampling and holding circuit.

8. The tracking circuit of claim 2, wherein said controlling signal generator comprises a trigger configured to generate said controlling signal in response to said output signals of said comparing circuit and said reset circuit to control operation of said solar power supply apparatus.

9. The tracking circuit of claim 8, further comprising a high frequency circuit to generate said controlling signal with a fixed higher frequency, wherein a duty cycle of said controlling signal increases when said real-time power increases, and wherein said duty cycle of said controlling signal decreases when real-time power decreases.

10. The tracking circuit of claim 9, wherein said high frequency circuit comprises a first constant current source, a second constant current source, a first switching circuit, a second switching circuit, a comparator, an inverter, and a capacitor, wherein:

a) said capacitor is coupled to a first terminal of said first constant current source, a first terminal of said second constant current source, and a first input terminal of said comparator, wherein a second terminal of said capacitor is coupled to ground;

b) a reference saw-tooth wave voltage is input to a second input terminal of said comparator;

c) a second terminal of said first constant current source is coupled to an output terminal of said trigger through said first switching circuit;

d) a second terminal of said second constant current source is coupled to said output terminal of said trigger through said second switching circuit and said inverter;

e) when said real-time power is increasing, said capacitor is charged through said first constant current source to obtain a rising capacitor voltage, and said duty cycle of said controlling signal increases; and f) when said real-time power is decreasing, said capacitor is discharged to obtain decreasing capacitor voltage, and said duty cycle of said controlling signal decreases.

11. The tracking circuit of claim 10, wherein a frequency of both charging and discharging of said capacitor is lower than an operating frequency of said solar power supply apparatus.

12. A maximum power point tracking method for a solar panel, the method comprising:

a) generating, by a memory power generator, a real-time power and a memory power from a real-time output voltage and a real-time output current of said solar panel;

b) comparing, by a comparing circuit, said real-time power against said memory power;

c) controlling, by a controlling signal generator, a controlling signal in response to said comparison of said real-time power and said memory power, wherein a trend of said controlling signal is maintained when said real-time power is increasing, and wherein said trend of said controlling signal is changed when said real-time power is decreasing;

d) detecting said real-time output voltage and an average output voltage of solar panel; and e) recovering said controlling signal when said real-time output voltage is higher than said average output voltage by at least a predetermined threshold.

13. The method of claim 12, wherein said controlling said controlling signal comprises maintaining a duty cycle of said controlling signal when said real-time power is increasing.

14. The method of claim 12, wherein said controlling said controlling signal comprises changing a duty cycle of said controlling signal when said real-time power is decreasing.

15. The method of claim 12, wherein said controlling said controlling signal comprises increasing a duty cycle of said controlling signal when said real-time power is increasing.

16. The method of claim 12, wherein said controlling said controlling signal comprises decreasing a duty cycle of said controlling signal when said real-time power is decreasing.

17. A solar power supply apparatus, comprising:

a) said maximum power point tracking circuit of claim 1;

b) a logic and driving circuit coupled to said maximum power point tracking circuit, wherein said logic and driving circuit is configured to generate a driving signal based on said controlling signal;

c) a power stage coupled to said solar panel and said logic and driving circuit, wherein an operation of said power stage is controllable by said driving signal.

18. The solar power supply apparatus of claim 17, wherein said power stage comprises a topology selected from a group consisting of buck, boost, buck-boost, and flyback.

19. The solar power supply apparatus of claim 17, wherein said maximum power point tracking circuit and a switch of said power stage are integrated into a single integrated circuit (IC).

20. A solar power supply system, comprising:

a) first and second solar power supply apparatuses, wherein each solar power supply apparatus comprises said solar power supply apparatus of claim 17;

b) a high frequency inverter power supply and a capacitor, wherein output voltages of said first and second solar power supply apparatuses are configured to be filtered by said capacitor to generate a DC bus voltage; and c) an inverter controller configured to convert said DC bus voltage to an AC voltage for a commercial power grid by controlling said high frequency inverter power supply.

* * * * *